United States Patent Office 2,842,506
Patented July 8, 1958

2,842,506

PROCESS FOR MAKING PLASTIC POLYURE-
THANE FOAM EMPLOYING WATER SOL-
UBLE TERTIARY AMINE-TERTIARY AMINE
SALT MIXTURES AS CATALYSTS

Philip A. Roussel, Wilmington, Del., assignor to E. I.
du Pont de Nemours and Company, Wilmington, Del.,
a corporation of Delaware No Drawing. Application December 2, 1953
Serial No. 395,843

6 Claims. (Cl. 260—2.5)

This invention relates to cellular plastic materials and more particularly to cellular materials resulting from the reaction of water in the presence of a catalyst with a polyurethane product formed from an arylene diisocyanate and at least one long-chain polyhydroxy compound. Still more particularly it relates to a plastic foam of this type which displays a reduced amount of shrinkage upon standing.

The preparation of cellular plastic products or plastic foams in which polyisocyanates are used as reactants is described in "German Plastics Practice" by De Bell et al., 1946, pages 316 and 463–465. These cellular materials are prepared from the reaction of diisocyanates with alkyd resins which contain free hydroxyl carboxyl groups. Somewhat similar plastic foams prepared from alkyd resins and diisocyanates are described in U. S. Patents 2,577,279 and 2,602,783 of Simon et al.

An isocyanate plastic foam having improved resistance to being deformed or destroyed by compression, flexing or impact is described in U. S. Patent No. 2,787,601. This foam is obtained by first reacting an excess of an arylene diisocyanate with a fatty acid triglyceride having a hydroxyl number of at least 49 to form an intermediate polyurethane product containing unreacted isocyanate groups, and thereafter foaming this product by reacting it with water in the presence of a tertiary amine catalyst. In U. S. application Serial No. 383,370 of Barthel, filed September 30, 1953, there are described plastic foams which are generally similar to those disclosed in U. S. Patent 2,787,601, but which display less shrinkage upon standing. These foams are prepared by reacting an excess of an arylene diisocyanate with a fatty acid triglyceride having a hydroxyl number of at least 49 and a compound containing a plurality of hydroxyl groups and having a molecular weight below about 200.

Although the various plastic foams mentioned above all possess desirable physical properties and are well suited for many applications, many of them exhibit some shrinkage upon standing. This is particularly true of foams made using a relatively small excess of the isocyanate. Shrinkage is especially noticeable and objectionable when the foams are used in making large articles or in filling cavities having large volumes. When shrinkage occurs, the density of the foam is increased and the cellular plastic material may pull away from its enclosing surfaces. The shape of articles made from the plastic foams may also be objectionably altered.

It is an object of this invention to provide a process for making cellular plastic materials of the type described having a reduced tendency to shrink upon standing. A further object is the provision of cellular products which display little or no shrinkage upon standing and which also have low density coupled with high resiliency and toughness. Further objects will appear from the detailed description of this invention which follows.

These objects are accomplished by the process of this invention in which an unfoamed fluid polyurethane product containing unreacted isocyanate radicals and formed by the reaction between an arylene diisocyanate and at least one long-chain compound containing a plurality of hydroxyl groups is foamed by mixing it with water and a catalyst mixture comprising a watersoluble tertiary amine having a basicity such that its 25% aqueous solution has a pH of at least 8.5 and a tertiary amine salt. For each equivalent of unreacted isocyanate radicals present in the polyurethane product there are used about 1 to 2 equivalents of water an from 0.01 to 0.04 mole of tertiary amine. The molar ration of amine salt to amine is from 0.25:1 to 3:1.

The preparation of foams according to this invention is accomplished simply by incorporating with the intermediate polyurethane product a mixture of water, the tertiary amine catalyst and the tertiary amine salt, and then placing the reaction mixture in the mold or other position where the foam is to be formed. Reaction begins at once with the evolution of carbon dioxide. The mass expands during this period and tends to fill the space in which it is confined. In a relatively short time, the reaction is completed and the foam cures at room temperature to give a firm cellular plastic material that is resistant to damage by compression and displays little or no shrinkage upon standing.

The intermediate polyurethane products which may be foamed according to the process of this invention are formed by the reaction between an arylene diisocyanate and at least one long-chain compound containing a plurality of hydroxyl groups. The fatty acid triglycerides having hydroxyl numbers of at least 49, such as castor oil, are particularly useful long-chain compounds for this purpose. Thus the intermediate polyurethane product may be formed as described in U. S. Patent 2,787,601 by the reaction of such a triglyceride and an arylene diisocyanate in such relative amounts that the ratio of triglyceride hydroxyl groups to isocyanate groups is from 0.45:2 to 0.95:2. Plastic foams of unusually desirable physical properties are obtained from the intermediate polyurethane product described in Barthel application Serial No. 383,370, which is formed by the reaction between an arylene diisocyanate, a fatty acid triglyceride having an hydroxyl number of at least 49, and a compound containing a plurality of hydroxyl groups and having a molecular weight below about 200, such as ethylene glycol, trimethylolpropane, polyethylene glycol and the like. These reagents are used in such relative amounts that the ratio of hydroxyl groups present in the low molecular weight polyhydroxy compound to triglyceride hydroxyl groups is from 0.6:1 to 2.3:1 and the ratio of the combined total number of hydroxyl groups to the number of isocyanate groups is from 0.65:2 to 1.1:2.

Another long-chain polyhydroxy compound useful in this connection is an alkyd resin containing terminal hydroxyl groups. Suitable alkyd resins are formed, for example, by the reaction between a polyhydroxy compound such as glycol, glycerine or trimethylolpropane with a dibasic acid such as adipic, phthalic, or succinic acid. The alkyd resin must not be too highly polymerized or cross-linked, as it is necessary that its initial reaction product with the arylene diisocyanate be still fluid in order that foaming may subsequently take place and so the reaction mixture may properly fill the mold.

The intermediate polyurethane product preferably has a viscosity within the range of from about 750 to 75,000 centipoises at 30° C. At these viscosities the carbon dioxide which is evolved does not escape from the mass to any extent, and a cellular mass is formed. If the viscosity is too low, the carbon dioxide merely bubbles out and escapes, while at too high a viscosity satisfactory mixing cannot be obtained and non-uniform cellular products of higher density result.

Enough water must be used to react with the unreacted isocyanate groups present in the intermediate polyurethane product but there should not be a large excess. The preferred amount of water is from 5 to 30% in excess of the stoichiometric equivalent of the unreacted isocyanate radicals present in the polyurethane product, although quite satisfactory results are obtained with from about 1 to 2 times this stoichiometric equivalent. If more than twice the theoretical amount of water is used, the excess remains in the foam and acts as a plasticizer. If too little water is used, the unreacted isocyanate groups tend to give instability and to produce a brittle foam.

The number of unreacted isocyanate groups in the polyurethane product may be readily ascertained by analysis, as for example by adding an excess of n-butylamine and back-titrating the excess amine with hydrochloric acid. The preparation of a polyurethane product by a given procedure and using definite proportions of ingredients results in a reasonably definite and consistent amount of unreacted isocyanate in the product, so that analyses of individual batches may often be dispensed with.

The amines that may be used in the process of this invention are those water-soluble tertiary amines having a basicity such that their 25% aqueous solutions have a pH of at least 8.5. Representative compounds include diethylethanolamine, dimethylethanolamine, methyl morpholine, pyridine, and trimethylamine. The amine must be water-soluble in order for it to catalyze the reaction of the water efficiently. From 0.01 to 0.04 mole of the tertiary amine should be used for each equivalent of unreacted isocyanate present in the polyurethane product. Ordinarily this corresponds roughly to about 0.005 to 0.015 mole for each 100 grams of the polyurethane product. When smaller amounts of the tertiary amine are used, the foaming reaction is quite slow and the foam is apt never to reach maximum size. The resulting foamed plastic tends to be friable and less resilient than is desirable. When excessive amounts of the tertiary amine catalyst are used, the resulting foams exhibit shrinkage.

For each molar part of the tertiary amine catalyst, there are employed from 0.25 to 3 molar parts of a tertiary amine salt. This salt may be formed from any of the amines mentioned above together with a mineral acid such as hydrochloric, nitric, sulfuric or phosphoric, or an organic acid which is as strong or stronger than acetic acid. When too little of the amine salt is used, the reduction in shrinkage attributable to the present invention is not secured. With more than 3 moles of amine salt per mole of amine, the resulting foamed plastic does not shrink, but no benefit is realized by use of the larger amounts. While ordinarily the amine salt is prepared from the same amine which is used as a catalyst, this is not necessary. The amine salt may be prepared separately and mixed with the amine, or the mixture may be formed by adding the proper amount of acid to an aqueous amine solution.

It is frequently desirable to use a dispersing agent in the water as it is mixed with the intermediate product. Among the dispersing agents which have been found to be satisfactory are: sodium carboxymethyl cellulose, lignin sulfonates, the lauric acid ester of triethanolamine, gelatine, and the diethyl cyclohexylamine salts of alkyl sulfates containing from 12 to 16 carbon atoms. Additives such as fillers, extenders, modifiers, etc., may also be incorporated into the plastic material to give various effects to the sponge structure. Generally speaking these materials give more rigid, more brittle and more dense products. Consequently when they are used they are added in minor amounts. Such products include magnesium carbonate, powdered wood cellulose, bentonite, silicon dioxide, calcium silicate, carbon black, glass fiber, magnesium stearate, methylene distearamide, etc. Magnesium stearate appears to cause somewhat larger cell structure and somewhat thicker cell walls.

The process of this invention is illustrated by the following examples, in which parts are by weight.

EXAMPLE 1

A. *Preparation of unfoamed polyurethane product*

To 1000 parts (5.75 moles) of 2,4-tolylene diisocyanate is added a mixture of 850 parts (0.91 mole) of castor oil (hydroxyl number about 160) and 150 parts (0.75 mole) of polyethylene glycol having a molecular weight of about 200. The reagents are mixed thoroughly and quickly. An exothermic reaction quickly sets in and the temperature rises to 100–120° C. in 10–15 minutes. This polyurethane product is then held at 110° C. for 1 hour, after which it is cooled and is ready for foaming. It contains approximately 0.38 equivalent of —NCO per 100 grams.

B. *Preparation of buffered catalyst foaming agent*

A solution of 60 parts (0.512 mole) of diethylethanolamine in 70 parts (3.9 moles) of water is prepared. Hydrogen chloride gas is bubbled in until a weight increase of 12.4 parts (0.34 mole HCl) has taken place. This solution then corresponds to 70 parts water, 20 parts diethylethanolamine and 52.4 parts of diethylethanolamine hydrochloride. After cooling to room temperature it is ready for use.

C. *Foaming the polyurethane product*

To 100 parts of the intermediate polyurethane product (containing about 0.38 equivalent of unreacted isocyanate groups), 8.96 parts of the buffered catalyst foaming agent are added and mixed in quickly. 8.96 parts of the catalyst mixture contain 0.245 mole water, 0.021 mole of the amine hydrochloride, and 0.011 mole of diethylethanolamine, giving a molar ratio of amine to amine hydrochloride of 0.5:1. This viscous mixture is poured into 3.5" x 5" x 7" forms. After 10 to 20 minutes the foaming is complete, the resin having expanded to fill the cavity and having risen to about 6 inches in height. The form may be removed from the foam after 1 hour.

When shrinkage occurs the sides of the block usually become depressed inward, i. e., concave. In order to determine the amount of shrinkage, the foamed block is cut parallel to its base and at the point of maximum shrinkage which usually occurs at about the center of the block. The minimum dimensions are then taken as a measure of the amount of shrinkage.

Examination of the foamed block of this example after standing for 24 hours shows no change in dimension and hence no shrinkage. When the same intermediate polyurethane produce is foamed with a similar diethylethanolamine-water mixture containing no amine hydrochloride, shrinkage occurs to such an extent that the dimensions of the section are reduced from 3.5" x 5" to 2.5" x 4.9".

EXAMPLE 2

Separate portions of the intermediate polyurethane product of Example 1 are foamed as previously described with diethylethanolamine-diethylethanolamine hydrochloride-water mixtures in various proportions and the results compared with foams obtained from catalyst-water mixtures containing no amine hydrochloride. In each case 4.2 parts of water are used for each 100 parts of polyurethane product, corresponding to 1.23 equivalents of water per equivalent of unreacted isocyanate. Shrinkage is determined as in Example 1 on the blocks of foam which have stood for 24 hours. In the following table, it is expressed as a percentage which is calculated as follows:

$$\text{Percent shrinkage} = \frac{100(WD - wd)}{WD}$$

where W is the original width of the block, D is the original depth, and w and d are the corresponding dimensions after the block has stood for 24 hours (taken at the point of greatest shrinkage).

| Sample | Moles of Diethylethanolamine per Equivalent of Isocyanate | Moles of Amine Salt per Mole of Amine | Percent Shrinkage |
|---|---|---|---|
| A | 0.013 | 0 | 25 |
| B | 0.013 | 0.5 | 0 |
| C | 0.013 | 1 | 0 |
| D | 0.013 | 2 | 0 |
| E | 0.013 | 3 | 0 |
| F | 0.021 | 0 | 30 |
| G | 0.026 | 0 | 30 |
| H | 0.026 | 0.25 | 0 |
| I | 0.026 | 0.33 | 0 |
| J | 0.026 | 0.5 | 0 |
| K | 0.026 | 0.59 | 0 |
| L | 0.026 | 1 | 0 |
| M | 0.026 | 1.5 | 0 |
| N | 0.026 | 2 | 0 |
| O | 0.026 | 2.6 | 0 |
| P | 0.026 | 3 | 0 |
| Q | 0.026 | 4 | 0 |
| R | 0.040 | 1 | 9 |
| S | 0.053 | 0.73 | 25 |
| T | 0.069 | 0.6 | 38 |
| U | 0.079 | 0.5 | 45 |

It is evident from the table that with this polyurethane product, shrinkage takes place even at low concentrations of catalyst when no amine salt is present (samples A, F and G). Shrinkage also takes place even in the presence of the amine salt when the amine concentration exceeds about 0.04 mole per equivalent of isocyanate (samples S, T and U). No shrinkage at all is observed, however, when less than 0.04 mole of amine per equivalent of unreacted isocyanate is used and when amine salt is present in ratios of 0.25 to 4 moles per mole of amine (samples B through E and H through Q).

EXAMPLE 3

Foams are prepared from the polyurethane product described in Example 1, but using dimethylethanolamine, N-methylmorpholine and pyridine as the amine catalysts, respectively, and the corresponding hydrochlorides as the amine salts. 25% aqueous solutions of these three amines at 25° C. display pH values of 11.5, 9.5 and 9.0 respectively. In each case, one sample of foam is prepared using 0.041 mole of amine per equivalent of isocyanate and no amine salt, and another sample is prepared using 0.026 mole of the amine and 0.026 mole of the amine salt for each equivalent of isocyanate. Shrinkage is shown in the following tabulation on the same basis as in Example 2.

| | | Percent Shrinkage | |
|---|---|---|---|
| | | No Amine Salt | With the Amine Salt |
| A | Dimethylethanolamine | 19 | 3 |
| B | N-methylmorpholine | 16 | 8 |
| C | Pyridine | 8 | 5 |

EXAMPLE 4

A series of foams is prepared using the procedure and the intermediate polyurethane product described in Example 1 but varying the amount of water used. In each case there is employed 0.026 mole of diethylethanolamine and 0.026 mole of diethylethanolamine hydrochloride per equivalent of unreacted isocyanate in the polyurethane product. The percent shrinkage, calculated as described in Example 2, is as follows for the different foams.

| Sample | Water Used in Excess of Theory, percent | Percent Shrinkage |
|---|---|---|
| A | 0 | 0 |
| B | 10 | 0 |
| C | 25 | 0 |
| D | 50 | 8 |
| E | 100 | 23 |

EXAMPLE 5

Plastic foams are prepared using the procedure and the polyurethane product described in Example 1, but with amine salts other than the hydrochloride. In each case there is used 0.026 mole of diethylethanolamine, 0.026 mole of a salt of diethylethanolamine, and 1.23 equivalents of water per equivalent of unreacted isocyanate in the polyurethane product. The amine salts are formed by adding the appropriate amount of the acid mentioned in the table directly to the amine. The results are as follows:

| Sample | Acid | Percent Shrinkage |
|---|---|---|
| A | Nitric | 0 |
| B | Sulfuric | 0 |
| C | Phosphoric | 0 |
| D | Acetic | 0 |
| E | Formic | 9 |

EXAMPLE 6

The polyurethane product of Example 1 is foamed by mixing it with 0.026 mole of diethylethanolamine and 1.23 moles of water per equivalent of unreacted isocyanate, and various amounts of diethylethanolamine hydrochloride. Each mixture is poured into a waxed box 12" x 12" x 18", permitted to foam and to set for one hour, and is then removed from the box. After about 24 hours standing each block is cut in two at the point of greatest shrinkage and the dimensions determined as with the smaller blocks of the preceding examples. Shrinkage is of course accentuated by use of the larger forms. The results are as follows:

| Sample | Moles of Amine Salt per mole of Amine | Percent Shrinkage |
|---|---|---|
| A | 0 | 56 |
| B | 1 | 11 |
| C | 1.5 | 14 |
| D | 1.75 | 8 |
| E | 2 | 12 |

EXAMPLE 7

An intermediate polyurethane product is prepared by mixing 174 parts of 2,4-tolylene diisocyanate and 340 parts of castor oil and heating to 70–95° C. for about 30 minutes under nitrogen. A mixture of 0.885 part of diethylethanolamine in 0.876 part of water is then quickly mixed into 50 parts of the prepolymer and the mixture poured into a polythene-lined mold, where foaming occurs. A rigid foamed resin composition is obtained which shows considerable shrinkage on standing.

When 50 parts of the same intermediate product are foamed with 1.8 parts of an amine-amine salt catalyst prepared from 49.1 parts water, 42.1 parts diethylethanolamine and 8.8 parts of anhydrous hydrogen chloride, the foamed resin that is obtained shows no shrinkage.

EXAMPLE 8

A polyester-diisocyanate condensation product is prepared by mixing 36.7 parts of an oil-modified alkyd resin having a hydroxyl number of 100 and an acid number of 6 and 13.3 parts of 2,4-tolylene diisocyanate, each at 32° C. The mixture is allowed to stand ten minutes and is then foamed by mixing in thoroughly and quickly a mixture of 0.89 part of diethylethanolamine in 1.25 parts of water. After two minutes, a foam is obtained which is of good cell structure, but shows considerable shrinkage.

When the polyester-diisocyanate condensation product is foamed by mixing in 2.5 parts of the amine-amine salt catalyst foaming agent described in Example 6, however, the foam obtained has good physical properties and shows only slight shrinkage.

Plastic foams prepared according to the process of this invention retain the desirable physical properties of similar foams prepared using a tertiary amine catalyst without any amine salt being present, and additionally show little or no shrinkage upon standing even when used in large volume units.

What is claimed is:

1. In a process of preparing a cellular plastic material from a foamable fluid polyurethane product having a viscosity of from about 750 to 75,000 centipoises at 30° C., said product containing unreacted isocyanate radicals and formed by the reaction between an arylene diisocyanate and at least one long-chain compound containing a plurality of hydroxyl groups, said long-chain compound being selected from the group consisting of a fatty acid triglyceride having a hydroxyl number of at least 49 and an alkyd resin containing a plurality of hydroxyl groups, the step which comprises mixing the said polyurethane product with water and a catalyst mixture comprising 1 molar part of a water-soluble tertiary amine having a basicity such that its 25% aqueous solution has a pH of at least 8.5 and from 0.25 to 3 molar parts of a salt of a tertiary amine having a basicity such that its 25% aqueous solution has a pH of at least 8.5, said salt being formed from an acid at least as strong as acetic acid, the amount of water being from about 1 to 2 times the stoichiometric equivalent of the unreacted isocyanate radicals in the polyurethane product, and the amount of tertiary amine being from 0.01 to 0.04 mole for each equivalent of unreacted isocyanate in the polyurethane product.

2. The process of claim 1 in which the polyurethane product is formed by the reaction between (a) an arylene diisocyanate, (b) a fatty acid triglyceride having a hydroxyl number of at least 49, and (c) a polyethylene glycol having a molecular weight of no more than about 200.

3. The process of claim 2 in which the arylene diisocyanate is 2,4-tolylene diisocyanate and the fatty acid triglyceride is castor oil.

4. The process of claim 2 in which the tertiary amine is diethylethanolamine.

5. The process of claim 4 in which the tertiary amine salt is the hydrochloride of diethylethanolamine.

6. The process of claim 2 in which the polyurethane product is formed by the reaction of 1000 parts by weight of 2,4-tolylene diisocyanate, 850 parts by weight of castor oil and 150 parts by weight of a polyethylene glycol having a molecular weight of about 200.

References Cited in the file of this patent

UNITED STATES PATENTS

| | | |
|---|---|---|
| 2,650,212 | Windemuth | Aug. 25, 1953 |
| 2,692,874 | Langerak | Oct. 26, 1954 |

OTHER REFERENCES

Interview with Bayer, Jan. 31, 1947, Office Tech. Services, PB 45, 246, 6 pages.